US008368823B2

(12) United States Patent
Watanabe et al.

(10) Patent No.: US 8,368,823 B2
(45) Date of Patent: Feb. 5, 2013

(54) ON-VEHICLE DISPLAY APPARATUS

(75) Inventors: Yoshinori Watanabe, Chita-gun (JP);
Hirokazu Shibata, Okazaki (JP)

(73) Assignee: Denso Corporation, Kariya, Aichi-Pref
(JP)

( * ) Notice: Subject to any disclaimer, the term of this patent is extended or adjusted under 35 U.S.C. 154(b) by 1360 days.

(21) Appl. No.: 11/902,068

(22) Filed: Sep. 18, 2007

(65) Prior Publication Data

US 2009/0073327 A1 Mar. 19, 2009

(51) Int. Cl.
*H04N 5/64* (2006.01)
(52) U.S. Cl. ........................................ 348/837
(58) Field of Classification Search .................... 348/837
See application file for complete search history.

(56) References Cited

U.S. PATENT DOCUMENTS

| | | | | |
|---|---|---|---|---|
| 6,597,338 | B2 | 7/2003 | Onodera | |
| 6,717,376 | B2 * | 4/2004 | Lys et al. | 315/292 |
| 6,879,326 | B1 | 4/2005 | Herman | |
| 2002/0044122 | A1* | 4/2002 | Kuwata et al. | 345/88 |
| 2004/0254716 | A1* | 12/2004 | Ino et al. | 701/200 |
| 2007/0105069 | A1 | 5/2007 | Yamagishi | |
| 2009/0015175 | A1* | 1/2009 | Chiang | 315/291 |
| 2010/0127634 | A1* | 5/2010 | Dowling et al. | 315/291 |
| 2010/0321376 | A1* | 12/2010 | Takatori | 345/214 |
| 2011/0037582 | A1* | 2/2011 | Wu | 340/438 |
| 2011/0037725 | A1* | 2/2011 | Pryor | 345/174 |

FOREIGN PATENT DOCUMENTS

| | | |
|---|---|---|
| JP | 2000-010543 | 1/2000 |
| JP | 2003-140799 | * 5/2003 |
| JP | 2004-157434 | 6/2004 |
| JP | 3591535 | 9/2004 |
| JP | 2005-041355 | * 2/2005 |
| JP | 2005-081866 | * 3/2005 |
| JP | 2007-109783 | 4/2007 |

OTHER PUBLICATIONS

Machine Translation of JP 2003-140799; Jun. 14, 2011.*
Machine Translation of JP 2005-081866; Jun. 14, 2011.*
Machine Translation of JP 2005-041355; Jun. 14, 2011.*
Japanese Office Action dated Jul. 2, 2010, issued in corresponding Japanese Application No. 2005-282739, with English translation.
Japanese Office Action dated Oct. 7, 2009, issued in corresponding Japanese Application No. 2005-282739, with English translation.

* cited by examiner

*Primary Examiner* — Mark Wendell
*Assistant Examiner* — Ryan Kwiecinski
(74) *Attorney, Agent, or Firm* — Nixon & Vanderhye PC

(57) ABSTRACT

A display apparatus for a vehicle includes a liquid crystal panel, a backlight unit, and a control circuit. The liquid crystal panel has a screen constructed with pixels. A first portion of the pixels displays a speed image indicating a vehicle speed. A second portion of the pixels displays a warning image indicating a vehicle abnormal condition. The control circuit adjusts brightness of the screen by controlling intensity of colors in the speed and warning images in such a manner that brightness of the warning image is greater than brightness of the speed image. The luminance of the light supplied to the screen by the backlight unit is kept constant.

15 Claims, 7 Drawing Sheets

| PALETTE No. | IMAGE TYPE | COLOR | BRIGHTNESS LEVEL | | | | | | | | | | |
|---|---|---|---|---|---|---|---|---|---|---|---|---|---|
| | | | 5 | | | 4 | | | .... | | 1 | | |
| | | | R | G | B | R | G | B | | | R | G | B |
| 0 | FRAME | BLACK | 0 | 0 | 0 | 0 | 0 | 0 | | | 0 | 0 | 0 |
| 1 | BACKGROUND | GLAY | 6 | 6 | 6 | 5 | 5 | 5 | | | 1 | 1 | 1 |
| 2 | TEXT 1 | BLACK | 0 | 0 | 0 | 0 | 0 | 0 | | | 0 | 0 | 0 |
| 3 | TEXT 2 | WHITE | F | F | F | E | E | E | | | B | B | B |
| 4 | GRAPHICS | GREEN | 0 | F | 0 | 0 | E | 0 | | | 0 | B | 0 |
| 5 | WARNING 1 | BLUE | 0 | 0 | F | 0 | 0 | F | | | 0 | 0 | F |
| 6 | WARNING 2 | RED | F | 0 | 0 | F | 0 | 0 | | | F | 0 | 0 |
| 7 | WARNING 3 | ORANGE | F | 8 | 0 | F | 8 | 0 | | | F | 8 | 0 |

| BRIGHTNESS LEVEL | Rn | Gn | Bn |
|---|---|---|---|
| 5 | - | - | - |
| 4 | 0.8 | 0.8 | 0.8 |
| 3 | 0.6 | 0.6 | 0.6 |
| 2 | 0.5 | 0.5 | 0.5 |
| 1 | 0.4 | 0.4 | 0.4 |

| BRIGHTNESS LEVEL | BACKLIGHT | BRIGHTNESS RATIO | MODE |
|---|---|---|---|
| 5 | 300cd/m² | 100% | DAY MODE |
| 4 | 300cd/m² | 80% | |
| 3 | 300cd/m² | 60% | NIGHT MODE |
| 2 | 300cd/m² | 50% | |
| 1 | 300cd/m² | 40% | |

FIG. 12
PRIOR ART

| BRIGHTNESS LEVEL | BACKLIGHT | DUTY RATIO | MODE |
|---|---|---|---|
| 5 | 300cd/m² | 100% | DAY MODE |
| 4 | 240cd/m² | 80% | |
| 3 | 180cd/m² | 60% | NIGHT MODE |
| 2 | 150cd/m² | 50% | |
| 1 | 120cd/m² | 40% | |

ON-VEHICLE DISPLAY APPARATUS

RELATED APPLICATION

This application is based on and incorporates herein by reference Japanese Patent Application No. 2005-282739 filed on Sep. 28, 2005.

FIELD OF THE INVENTION

The present invention relates to a display apparatus that is mounted on a vehicle and displays various information on a screen.

BACKGROUND OF THE INVENTION

Recently, a conventional mechanical meter installed on an instrument panel of a vehicle has been replaced with an image display apparatus such as a liquid crystal display (LCD) apparatus. One advantage of such an image display apparatus is that design and layout of a screen image can be freely adjusted. As disclosed, for example, in JP-A-2004-157434, an image display apparatus has been proposed that displays a navigation image of a navigation system, in addition to a meter image corresponding to a mechanical meter.

In a color LCD used in such an image display apparatus disclosed in JP-A-2004-157434, brightness of a screen is adjusted by adjusting luminosity of light emitted by a backlight device. Specifically, as shown in FIG. 12, the brightness of the screen is adjusted by adjusting a duty ratio of a pulse width modulated (PWM) voltage applied to the backlight device. For example, when the image display apparatus operates in a day mode, the duty ratio of the PWM voltage is set to 100% so that the brightness of the screen is set to a maximum level (i.e., level 5). When the image display apparatus operates in a night mode, the duty ratio of the PWM voltage is set to 60% so that the brightness of the screen is set to a medium level (i.e., level 3).

Likewise, in a self-light-emitting display apparatus (e.g., organic electroluminescence (OEL) display) constructed with self-light-emitting elements, brightness of a screen is adjusted by adjusting voltage (or present) applied to the elements.

In the conventional image display apparatus described above, brightness of an image displayed on a screen varies with brightness of the screen. Therefore, as the brightness of the screen is set to a lower level, the image displayed on the screen becomes less-visible to an user (i.e., driver and occupants). As a result, even when a warning image indicating abnormal condition of a vehicle is displayed on the screen, the user may not find the warning image immediately.

SUMMARY OF THE INVENTION

In view of the above-described problem, it is an object of the present invention to provide an on-vehicle display apparatus that changes intensity of colors in an image displayed on a screen to facilitate visualization of the image.

A display apparatus for a vehicle includes a liquid crystal panel, a drive circuit, a light source, a setting device, and a controller. The liquid crystal panel has a display screen constructed with a plurality of pixels. A first portion of the plurality of pixels is configured to display a speed image indicating a speed of the vehicle. A second portion of the plurality of pixels is configured to display a warning image indicating an abnormal condition of the vehicle. A third portion of the plurality of pixels is configured to display a background image serving as a background of both the speed image and the alarm image. The drive circuit is coupled to the liquid crystal panel and drives the liquid crystal panel. The light source is configured to backlight the liquid crystal panel to supply light to the display screen of the liquid crystal panel. The setting device is configured to set brightness of the display screen of the liquid crystal panel to a predetermined level. The controller is coupled between the setting device and the drive circuit.

The controller adjusts the brightness of the display screen of the liquid crystal panel based on an input from the setting device by controlling the drive circuit in such a manner that a first intensity value of the first portion of the plurality of pixels varies in accordance with the input from the setting device and a second intensity value of the second portion of the plurality of pixels is constant regardless of the input from the setting device. The first and second intensity values are selected so that brightness of the warning image is greater than brightness of the speed image. The luminance of the light supplied to the display screen by the light source is constant regardless of the input from the setting device.

BRIEF DESCRIPTION OF THE DRAWINGS

The above and other objectives, features and advantages of the present invention will become more apparent from the following detailed description made with check to the accompanying drawings. In the drawings:

FIG. 12 is a diagram showing a relationship between luminous of light emitted by a backlight unit and brightness of a screen of a conventional display apparatus.

DETAILED DESCRIPTION OF THE PREFERRED EMBODIMENT

Figure 1:
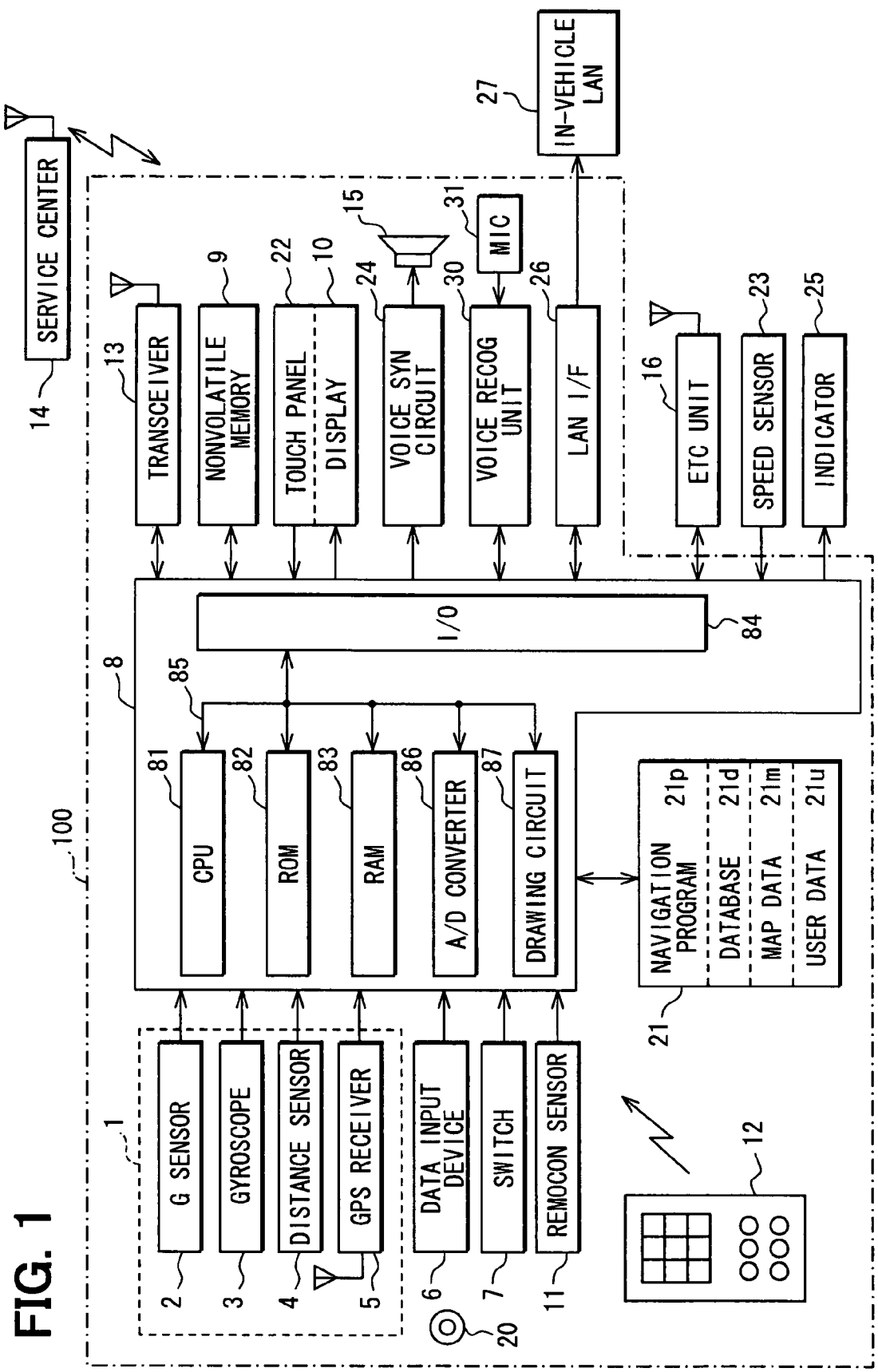
FIG. 1 is a block diagram of a navigation system according to an embodiment of the present invention.

As shown in FIG. 1, a vehicle navigation system 100 according to an embodiment of the present invention includes a position sensor 1, a data interface device 6, a switch 7, a control circuit 8, an nonvolatile memory 9, a display apparatus 10, a remote control (remocon) sensor 11, a remote controller 12, a speaker 15, a hard disk device 21, and a voice synthesis device 24.

The position sensor 1 includes a geomagnetism (G) sensor 2, a gyroscope 3, a distance sensor 4, and a global positioning system (GPS) receiver 5. Each output of the geomagnetism sensor 2, the gyroscope 3, the distance sensor 4, and the GPS receiver 5 has a different kind of a measurement error. The outputs compensate each other so that the position sensor 1 can accurately detect present location of the vehicle. Alternatively, some of the geomagnetism sensor 2, the gyroscope 3, and the distance sensor 4 may be removed from the position sensor 1, as long as the accuracy in the measurement can be ensured. Alternatively, the position sensor 1 may further use sensor outputs from at least one of a steering angle sensor (not shown), a wheel sensor (not shown), and a speed sensor 23 to detect the present location of the vehicle more accurately.

The navigation system 100 is controlled by commands received through the switch 7, the remote controller 12, or a microphone 31.

For example, the switch 7 appears on a touch panel 22 of the display apparatus 10. For example, the touch panel 22 is a resistive touch panel, which is composed of a glass substrate and a transparent film separated from the glass substrate by thin space. Each of the glass substrate and the transparent film is provided with an electrical wiring in X-axis and Y-axis directions. When a user touches the transparent film with a finger, the electrical wiring is shorted at the touched point so that a voltage change occurs. Thus, the touched point is detected as two-dimensional, coordinates (X, Y). Alternatively, the touch panel 22 may be a capacitive touch panel. Alternatively, the switch 7 may be a mechanical switch. Alternatively, the switch 7 may appear on a screen of the display apparatus 10 and be operated by an input device such as a mouse.

The microphone 31 picks up the user's voice and converts the voice into a voice signal. A voice recognition unit 30 receives the voice signal from the microphone 31, and converts the voice signal into a control command. For example, the voice recognition unit 30 is based on Hidden Markov model (HMM).

A transceiver unit 13 receives road traffic information from an external service center 14 such as a traffic message channel (TMC) center used in Europe, or a vehicle information and communication system (VICS) center used in Japan. An electronic toll collection (ETC) unit 16 receives toll information from an ETC system (not shown) installed at a gate of a toll road. The transceiver unit 13 and the ETC unit 16 may be combined into a single unit.

The control circuit 8 includes a central processing unit (CPU) 81, a read only memory (ROM) 82, a random access memory (RAM) 83, an input/output (I/O) circuit 84, an analog-to-digital (A/D) converter 86, and a drawing circuit 87. The CPU 81, the ROM 82, the RAM 83, the I/O circuit 84, the A/D converter 86, and the drawing circuit 87 are linked to each other through a bus 85. The CPU 81 operates in accordance with a navigation program 21*p* stored in the hard disk device 21 and writes data to the hard disk device 21. The A/D converter 86 converts analog data received from the position sensor 1 into digital data, which can be processed by the CPU 81. The ROM 82 may include a backup program for the navigation program 21*p* for a breakdown of the hard disk device 21. The drawing circuit 87 creates drawing data for images displayed on the screen of the display apparatus 10 by using image data and color data stored in the hard disk device 21.

In addition to the navigation program 21*p*, the hard disk device 21 stores map data 21*m*. The map data 21*m* includes road images and road network information. The road network information includes link information, node information, and link connection information. The link information is section information of the road and includes positional coordinates, distance, travel time, lane width, the number of lanes, speed limit, and the like. The node information is intersection information of the road and includes positional coordinates, the number of right and left turn lanes, and the like. The link connection information is road close/open information.

The user can write user data 21*u* to the hard disk device 21. For example, user data 21*u* includes a route to user's favorite destination. The user data 21*u* can be modified through switch 7, remote controller 12, touch panel 22, and microphone 31. The hard disk device 21 may further store database data 21*d* having various data including data necessary for the navigation system 100 to perform navigation.

A storage media 20 having new data is inserted into data interface device 6 so that map data 21*m* and user data 21*u* stored in the hard disk device 21 can be added or updated. The storage media 20 may be, for example, a CD media, a DVD media, a memory card, or the like. Alternatively, map data 21*m* and user data 21*u* may be added or updated by downloading new data via an external network.

The nonvolatile memory 9 may be, for example, a rewritable semiconductor memory such as an electrically erasable programmable read-only memory (EEPROM), or a flash memory. The nonvolatile memory 9 stores data necessary for the navigation system 100 to perform navigation. The nonvolatile memory 9 can retain the stored contents, even when an accessory switch of the vehicle is turned off, i.e., the navigation system 100 is powered off.

Instead of or in addition to the nonvolatile memory 9, the hard disk device 21 may store the necessary data. Alternatively, the necessary data may be distributed and stored between the nonvolatile memory 9 and the hard disk device 21.

Figure 2:
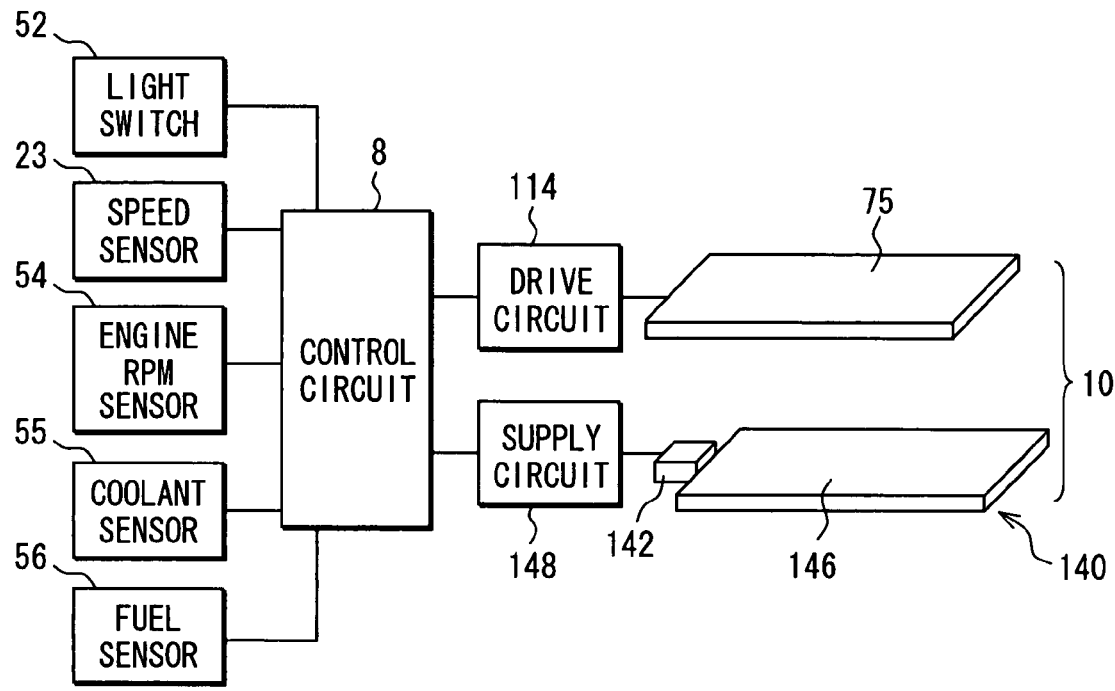
FIG. 2 is a block diagram of an image display apparatus in the navigation system.

As shown in FIG. 2, the display apparatus 10 includes a drive circuit 114, a backlight unit 140, a power supply circuit 148, and a liquid crystal panel 75. The liquid crystal panel 75 is a thin film transistor (TFT) panel, i.e., active matrix panel. The liquid crystal panel 75 can display an image in color or monochrome. The backlight unit 140 includes a white light-emitting diode (LED) 142 and a light diffusion plate 146. The backlight unit 140 is powered by the power supply circuit 148 and backlights the liquid crystal panel 75. Thus, the image displayed on the liquid crystal panel 75 can be seen by the user.

The control circuit 8 receives vehicle information from sensors for detecting vehicle conditions and causes the display apparatus 10 to display the vehicle information. For example, as shown in FIG. 2, the control circuit 8 receives light information, vehicle speed information, engine speed information, engine coolant temperature information, and fuel level information from a light switch 52, the speed sensor 23, an engine speed sensor 54, a coolant temperature sensor 55, and a fuel level sensor 56, respectively.

The speed sensor 23 includes a rotation detection device (e.g., rotary encoder) and is mounted near a tire wheel of the vehicle. The speed sensor 23 detects and converts the number of rotations of the tire wheel into pulse signals. The pulse signals are indicative of the number of tire rotations and are transmitted to the control circuit 8. The control circuit 8 calculates the speed of the vehicle based on the pulse signals. For example, from the calculated speed, the control circuit 8 determines an average speed of the vehicle on a given section of a road and estimates the arrival time to the destination.

The light switch 52 is included in the switch 7 and used to turn on/off vehicle lamps such as a headlamp and a side lamp. For example, when the vehicle lamps are turned off through the light switch 52, the display apparatus 10 switches to a day mode. In contrast, when the vehicle lamps are turned on through the light switch 52, the display apparatus 10 switches to a night mode.

The engine speed sensor 54 detects engine revolutions per minute (RPM). The coolant temperature sensor 55 detects temperature of engine coolant. The fuel level sensor 56 detects a fuel level.

The speaker 15 is connected to the voice synthesis device 24, which is connected to the I/O circuit 84 of the control circuit 8. In response to a command from the navigation program 21*p*, digital voice data stored in the hard disk device 21 or the nonvolatile memory 9 is transmitted to the voice synthesis device 24. The voice synthesis device 24 converts the digital voice data into an analog voice signal and transmits the analog voice signal to the speaker 15. Thus, the speaker 15 produces an audible message corresponding to the analog voice signal.

A local area network (LAN) I/O circuit 26 acts as an interface between an in-vehicle LAN 27 and the control circuit 8. The ETC unit 16 and the speed sensor 23 may be connected to the control circuit 8 through the LAN I/O circuit 26.

When the navigation system 100 is powered on, the CPU 81 of the control circuit 8 executes the navigation program 21*p*. Then, a navigation menu appears on the screen of the display apparatus 10. When a routing function is selected from the menu through the switch 7, the touch panel 22, the remote controller 12, or the microphone 31, the navigation system 100 operates to display a route to a user's destination.

Specifically, the user selects a location to be set as a destination from a road map, which is displayed on the screen of the display apparatus 10. For example, the user selects the location from prestored location data in the hard disk device 21 or by using address searching function, phone number searching function, or the like. When the selected location is set as the destination, the present location of the vehicle is detected by the position sensor 1. Then, an optimum route (e.g., shortest route) from the present location to the destination is automatically calculated based on, for example, Dijkstra's algorithm. The optimum route is overlayed on the road map displayed on the screen of the display apparatus 10. Further, at least one of the display apparatus 10 and the speaker 15 produces an audible message for navigation. Thus, the navigation system 100 navigates the user to the destination by way of the optimum route.

An indicator lamp 25 includes a light emitting device such as a light emitting diode (LED) and a driver circuit for driving the light emitting device. The indicator lamp 25 is independently provided of the display apparatus 10 and displays vehicle information, which are required by the user even when the display apparatus 10 is powered off. For example, the vehicle information includes turn signal light state, high beam light state, seatbelt warning light state, open (e.g., half-shut) door warning light state, and the like. The vehicle information is transmitted to the indicator lamp 25 via the in-vehicle LAN 27.

Figure 3:
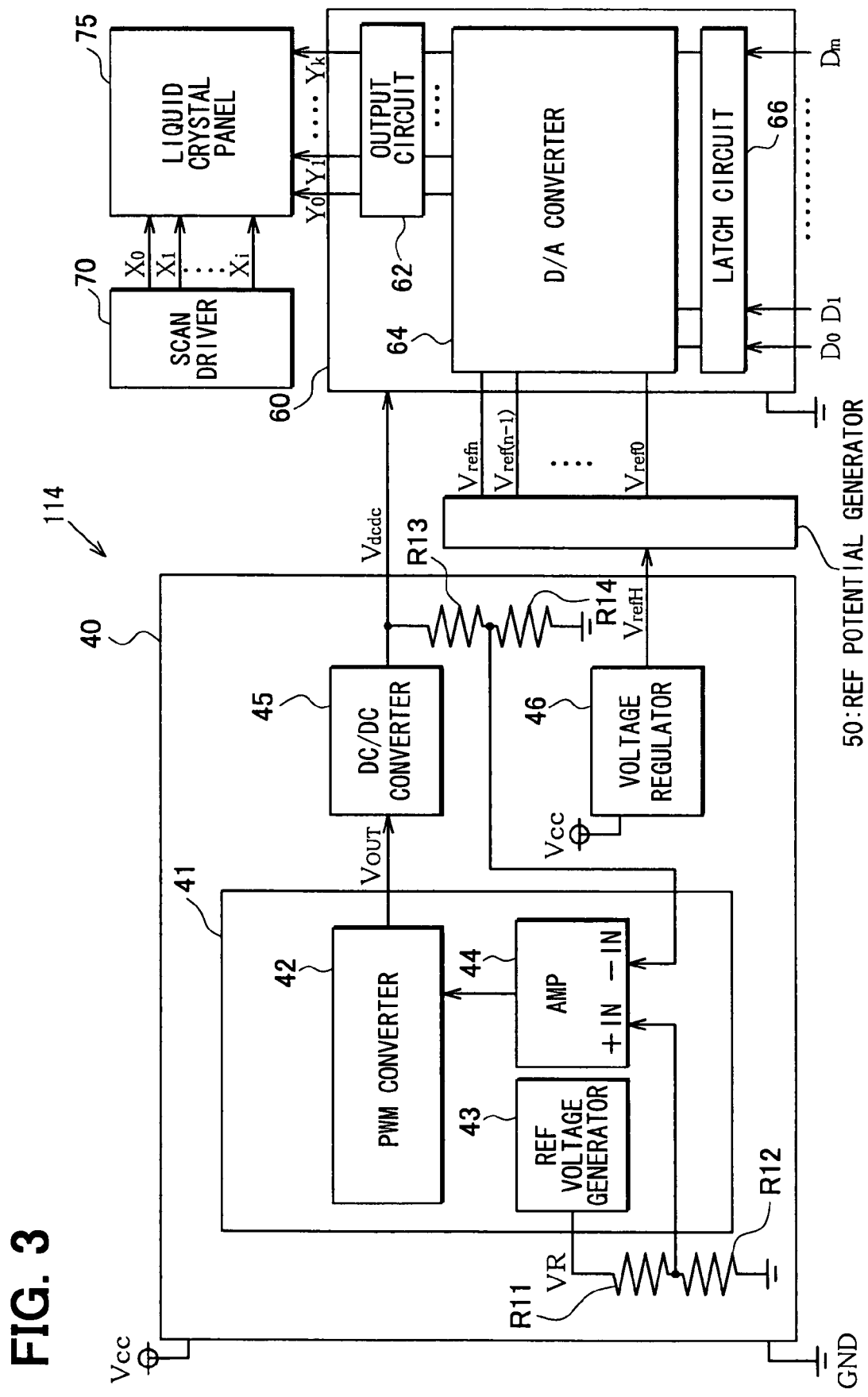
FIG. 3 is a block diagram of a drive circuit of the display apparatus.

As shown in detail in FIG. 3, the drive circuit 114 of the display apparatus 10 includes a liquid crystal drive power supply circuit 40, a reference potential generator 50, a source driver circuit 60, and a scan driver circuit 70.

The power supply circuit 40 generates a driving voltage Vdcdc supplied to the source driver circuit 60 and a maximum potential VrefH supplied to the reference potential generator 50. Based on the maximum potential VrefH, the reference potential generator 50 generates a plurality of reference potentials Vref0-Vrefn by using, for example, a voltage divider circuit (not shown) formed with resistors.

The source driver circuit 60 includes a latch circuit 66, an output circuit 62, and a digital to analog (D/A) converter 64. The latch circuit 66 is powered by the driving voltage Vdcdc supplied from the power supply circuit 40 and latches a plurality of digital image data D0-Dm inputted from the control circuit 8. The D/A converter 64 converts the digital image data D0-Dm into analog signals by using the reference potentials Vref0-Vrefn supplied from the reference potential generator 50. The output circuit 62 performs buffering of the analog signals and outputs a plurality of analog image signals Y0-Yk to the liquid crystal panel 75. Alternatively, the D/A converter 64 may be removed from the source driver circuit 60. In this case, the digital image data D0-Dm is outputted as digital image signals to the liquid crystal panel 75.

The scan driver circuit 70 outputs scan signals X0-Xi at a predetermined time interval to the liquid crystal panel 75. The liquid crystal panel 75 is constructed with a plurality of pixel cells arranged in a matrix manner. Each pixel cell is turned on and off by a thin film transistor. The image displayed on the liquid crystal panel 75 is determined by the analog image signals Y0-Yk outputted from the source driver circuit 60 and the scan signals X0-Xi outputted from the scan driver circuit 70.

As shown in FIG. 3, the power supply circuit 40 includes a converter controller 41, a step-up DC/DC converter 45, a voltage regulator circuit 46, a first voltage divider circuit constructed with resistors R11, R12, and a second voltage divider circuit constructed with resistors R13, R14.

The power supply circuit 40 is supplied with a power supply voltage Vcc and generates the driving voltage Vdcdc from the power supply voltage Vcc by using the DC/DC converter 45. Likewise, the power supply circuit 40 generates the maximum potential VrefH from the power supply voltage Vcc by using the voltage generator circuit 46. For example, the voltage generator circuit 46 has accuracy of plus or minus 2 percent. Alternatively, the power supply circuit 40 may generate the maximum potential VrefH from the driving voltage Vdcdc by using the second voltage divider constructed with the resistors R13, R14. Each of the driving voltage Vdcdc and the maximum potential VrefH is greater than the power supply voltage Vcc.

The converter controller 41 controls the DC/DC converter 45 and includes a pulse width modulation (PWM) signal generator 42, a reference voltage generator 43, and an amplifier circuit 44. The reference voltage generator 43 generates a reference voltage VR.

A first divided voltage obtained by dividing the reference voltage VR by the first voltage divider circuit constructed with the resistors R11, R12 is applied to a non-inverting input terminal +IN of the amplifier circuit 44. A second divided voltage obtained by dividing the driving voltage Vdcdc by the second voltage divider circuit constructed with the resistors R13, R14 is applied to an inverting input terminal −IN of the amplifier circuit 44. The amplifier circuit 44 amplifies a difference between the first and second divided voltages and outputs the amplified differential voltage to the PWM signal generator 42. The PWM signal generator 42 outputs a PWM signal Vout having a pulse width corresponding to magnitude of the output voltage of the amplifier circuit 44.

Resistances of the resistors R11-R14 are set, so that the first and second divided voltages become equal to each other when the driving voltage Vdcdc is a target voltage level. Thus, the driving voltage Vdcdc is feedback-controlled to the target voltage level.

Each pixel cell of the liquid crystal panel 75 consists of three primary colors, i.e., red (R), green (G), and blue (B). New colors are created by mixing varying intensity values of the three primary colors.

Figure 4:
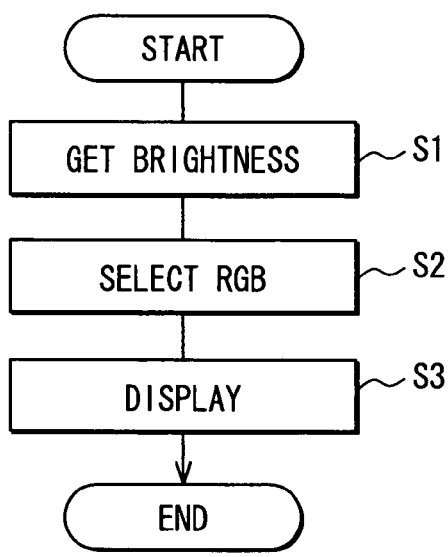
FIG. 4 is a flow chart of a process performed to adjust intensity of colors by a control circuit of the navigation system.

In response to adjustment commands inputted through switch 7, remote controller 12, touch panel 22, or microphone 31, control circuit 8 performs a first adjustment process illustrated by FIG. 4 to adjust brightness of the screen of display apparatus 10. Thus, switch 7, remote controller 12, touch panel 22, or microphone 31, and control circuit 8 can act as a setting device to set brightness of the screen to a predetermined level. The first adjustment process is implemented by navigation program 21p.

The first adjustment process starts with step S1, where the control circuit 8 gets brightness level data of the screen. The brightness level data is stored in the RAM 83 or the nonvolatile memory 9, when the brightness of the screen is adjusted by the user. Then, the first adjustment process proceeds to step S2, where the control circuit 8 refers to a palette table shown in FIG. 5. Based on the brightness level data gotten at step S1, the control circuit 8 selects intensity data (i.e., RGB values) for each image from the palette table. The image is included in the drawing data, which is created by the drawing circuit 87. The control circuit 8 creates the digital image data D0-Dm for the image by adding the intensity data to the drawing data and outputs the digital image data D0-Dm to the latch circuit 66 of the display apparatus 10. Then, the first adjustment process proceeds to step S3, where the display apparatus 10 displays the image on the screen based on the digital image data D0-Dm.

Figures 5, 6:
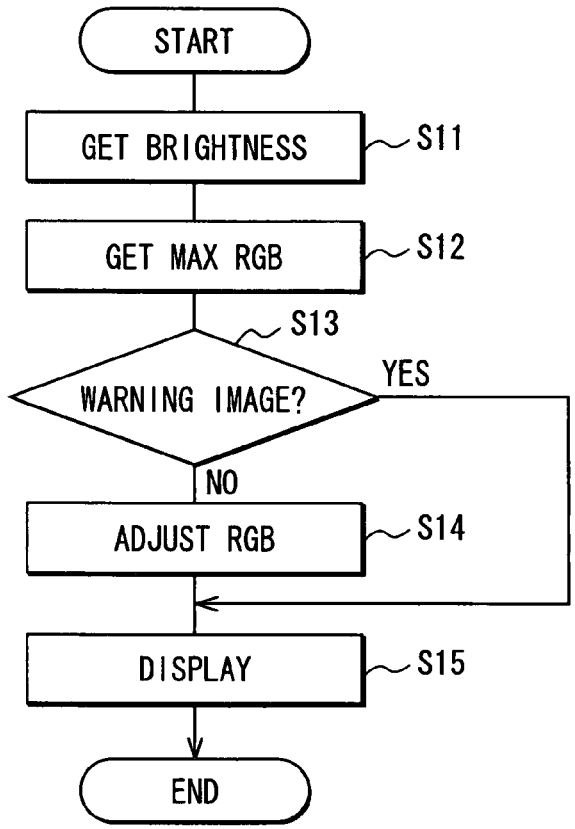
FIG. 5 is a diagram showing a palette table used by the process of FIG. 4.
FIG. 6 is a flow chart of another process performed to adjust intensity of colors by the control circuit of the navigation system.

The palette table shown in FIG. 5 is prestored in the hard disk device 21 or a memory (not shown) in the drawing circuit 87. The palette table provides mapping among a RGB value of each pixel cell of the liquid crystal panel 75, a type of an image displayed on the screen, and a brightness level of the screen. In the case of FIG. 5, the RGB value is adjusted in sixteen levels from 0 to F (hexadecimal).

As can be seen from FIG. 5, RGB values for images except for warning images change with the brightness level of the screen of the display apparatus 10. For example, when the brightness level of the screen is level 5, (i.e., maximum level), a RGB value for a graphic image is set to "0F0". Then, when the brightness level of the screen changes to level 1 (i.e., minimum level), the RGB value for the graphic image changes to "0B0". As a result, the graphic image changes in color from bright green to dark green. Thus, the brightness of the screen is adjusted by adjusting intensity of colors in an image displayed on the screen.

In contrast, RGB values for warning images 1-3 are kept constant regardless of the brightness level of the screen. Specifically, a RGB value for the warning image 1 remains "00F" so that the warning image 1 can be displayed in bright green. A RGB value for the warning image 2 remains "F00" so that the warning image 2 can be displayed in bright red. A RGB value for the warning image 3 remains "F80" so that the warning image 3 can be displayed in bright orange. In such an approach, even when the screen is dark (e.g., set to the brightness level 1), the user can surely find the warning images 1-3.

For example, the warning images 1, 2, 3 are used to inform the user of the following information:

1). Information of traffic and weather of the present location of a vehicle. The traffic information and the weather information are received through the transceiver unit 13. The present location of the vehicle is detected through the position detector 1.

2). Information displayed by the indicator lamp 25.

3). Information indicating malfunctions (i.e., abnormal conditions) of the vehicle. The information is received from sensors and apparatus mounted to the vehicle through the in-vehicle LAN 27.

4). Information indicating malfunctions of a navigation system.

5). Information associated with navigation. For example, the information can include points at which the vehicle turns right or left.

Alternatively, the control circuit 8 may perform a second adjustment process illustrated by FIG. 6 to adjust the brightness of the screen of the display apparatus 10. The second adjustment process is implemented by the navigation program 21p.

The second adjustment process starts with step S11, where the control circuit 8 gets the brightness level data of the screen. The brightness level data is stored in RAM 83 or nonvolatile memory 9. Then, the second adjustment process proceeds to step S12, where control circuit 8 gets maximum intensity data (i.e., RGB value) for each image included in the drawing data. The maximum RGB value for each image is stored in hard disk device 21 or the memory of drawing circuit 87. The maximum RGB value allows each image to be displayed on the screen at maximum brightness. For example, the maximum RGB value corresponds to the RGB value of the brightness level 5 of the palette table of FIG. 5.

Then, the second adjustment process proceeds to step S13, where control circuit 8 determines whether the drawing data includes a warning image. If the drawing data does not include the warning image, the second adjustment step proceeds to step S14. At step S14, control circuit 8 refers to a coefficient table shown in FIG. 7 and selects a coefficient factor (Rn, Gn, Bn) from the coefficient table according to the brightness level of the screen. For example, when the brightness level of the screen is level 2, the selected coefficient factor is (R2, G2, B2)=(0.5, 0.5, 0.5). Then, control circuit 8 adjusts the maximum RGB value obtained at step S12 by multiplying the maximum RGB value by the selected coefficient factor. For example, when the maximum RGB value is (R, G, G)=(6, 6, 6), the maximum RGB value (6, 6, 6) is adjusted to 0.5(6, 6, 6)=(3, 3, 3). Then, the second adjustment process proceeds to step S15, where the image is displayed on the screen at the adjusted RGB value. Thus, the intensity of colors in the image except for the warning image is adjusted according to the brightness level of the screen of display apparatus 10.

In contrast, at step S13, if the drawing data includes the warning image, the second adjustment step jumps to step S15. At step S15, the warning image is displayed on the screen at the maximum RGB value. Thus, the intensity of colors in the warning image is kept constant regardless of the brightness level of the screen of the display apparatus 10. In such an approach, even when the screen is dark, the user can surely find the warning image. Alternatively, even if the drawing data includes the warning image, the second adjustment step may proceed to step S15 via step S14. In this case, the maximum RGB value for the warning image is adjusted by multiplying the maximum RGB value by a coefficient factor (R5, G5, B5)=(1, 1, 1).

Figures 7, 8, 9:
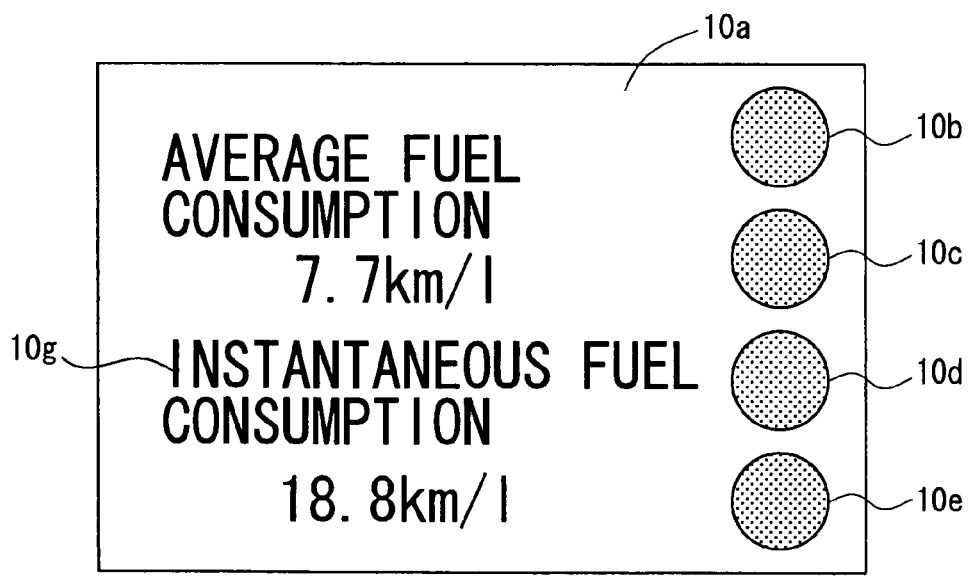
FIG. 7 is a diagram showing a coefficient table used by the process of FIG. 6.
FIG. 8 is a diagram showing a relationship between luminous of light emitted by a backlight unit and brightness of a screen of the display apparatus.
FIG. 9 is a diagram showing images displayed on the screen when the brightness of the screen is set to a maximum level.

According to the exemplary embodiment, brightness of the screen of display apparatus 10 is adjusted by adjusting intensity of colors in an image displayed on the screen. In other words, as shown in FIG. 8, luminosity of light emitted by backlight unit 140 is kept constant. Since the luminosity of light emitted by backlight unit 140 is kept constant, a controller for backlight unit 140 can be unnecessary so that manufacturing cost can be reduced. Further, since the luminosity of light emitted by backlight unit 140 is kept constant, backlight unit 140 life can be increased.

Figure 10:
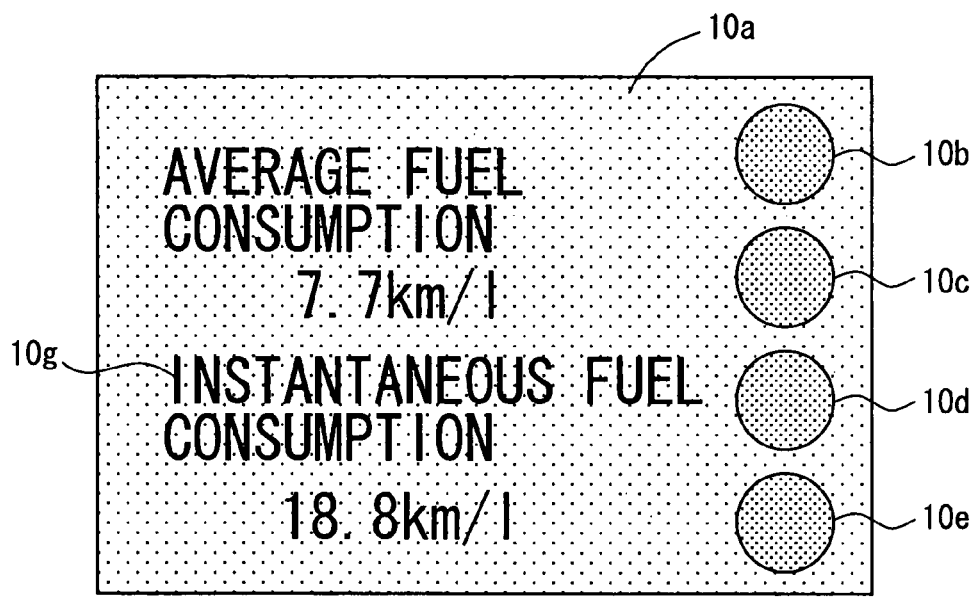
FIG. 10 is a diagram showing the images displayed on the screen when the brightness of the screen is set to a minimum level.

FIG. 9 shows a screen of display apparatus 10, the brightness of which is set to the maximum level, i.e., level 5. FIG. 10 shows a screen of display apparatus 10, the brightness of which is set to the minimum level, i.e., level 1. In FIGS. 9, 10, a text image 10g indicates a fuel consumption calculated from fuel level information and travel distance information. The fuel level information is received from fuel level sensor 56 and travel distance information is received from distance sensor 4 of position sensor 1.

When the brightness of the screen is adjusted from the level 5 to the level 1, intensity of colors in both a background image 10a is reduced according to the brightness level. As a result, the text image 10g may be less-visible or invisible to the user. In contrast, even when the brightness of the screen is adjusted from the level 5 to the level 1, intensity of colors in warning images 10b-10e is kept constant. Thus, the user can surely find the warning images 10b-10e immediately. The warning images 10b-10e may be produced by superimposing a text image on a graphics image.

In FIGS. 9, 10, a navigation image instead of the text image 10g may be displayed on the screen of the display apparatus 10. In this case, a navigation warning image is highlighted relative to a road image by changing intensity of colors in the navigation warning image. For example, the navigation warning image can indicate an abnormal condition of the navigation system, a route to a predetermined destination, points at which the vehicle turns right or left to reach the destination, and traffic information received from the service center 14 through the transceiver unit 13.

(Modifications)

The exemplary embodiment described above may be modified in various ways. For example, the display apparatus 10 may be a self-light-emitting display apparatus such as an organic electroluminescence (OEL) display or a plasma display. In this case, the intensity of colors in an image is changed by changing a voltage applied to pixel cells that form the image. Specifically, a voltage applied to pixel cells that form a warning image is set greater than a voltage applied to pixel cells than for other images so that the warning image can be surely found by the user.

Figure 11:
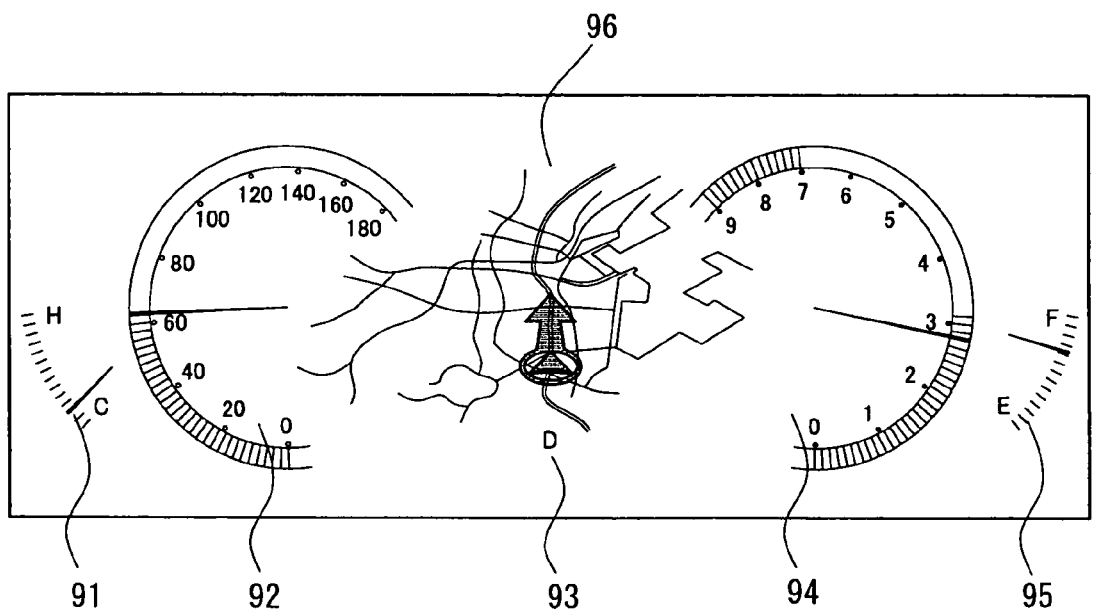
FIG. 11 is a diagram showing images displayed on a screen of a display apparatus according to a modification.

As shown in FIG. 11, the present invention can be applied to an on-vehicle display system that can display meter images 91-95 in addition to a navigation image 96. The meter images 91-95 indicate a coolant temperature, a vehicle speed, a shift lever position, an engine RPM, and a fuel level, respectively. For example, when the fuel level decreases below a predetermined level, intensity of colors in the meter image 95 or a warning image associated with the fuel level is set greater than that in other images so that the meter image 95 or the warning image can be surely found by the user immediately.

It is possible that the brightness of the screen cannot be reduced below a predetermined level in view of legal constraints associated with meter images 91-95. In such a case, only the brightness of the navigation image 96 can be reduced by changing intensity of colors in the navigation image 96.

For example, in the on-vehicle display system, a meter ECU (not shown) is linked to the vehicle navigation system 100 through the in-vehicle LAN 27. The meter ECU receives vehicle information from the sensors such as the speed sensor 23 and the vehicle information is displayed as the meter images 91-95. The navigation information is received from the navigation system 100 and displayed as the navigation image 96. Alternatively, the navigation information is displayed as the navigation image 96 after processed by the meter ECU.

The present invention can be applied to various image display apparatus such as a rear-view monitor and a monitor for a vehicle stereo system. Intensity of colors in an image displayed on a screen can be changed in accordance with priority so that an image for indicating highly prioritized information can be surely found by the user.

Such changes and modifications are to be understood as being within the scope of the present invention as defined by the appended claims.

What is claimed is:

1. A meter display apparatus configured for mounting on a vehicle, said display apparatus comprising:
   a liquid crystal panel including a display screen having a first portion for displaying a warning image and a second portion for displaying a non-warning image;
   a light source configured to backlight the liquid crystal panel at a constant luminance;
   a first memory portion configured to store first color intensity data used for displaying the warning image;
   a second memory portion configured to store second color intensity data used for displaying the non-warning image; and
   a control circuit configured to display the warning image based on the first color intensity data and configured to display the non-warning image based on the second color intensity data,
   wherein the control circuit changes an intensity of color displayed in the non-warning image in order to change brightness of the non-warning image while maintaining a brightness of the warning image that is greater than the non-warning image brightness regardless of a selected overall display screen brightness,
   wherein the control circuit is configured to maintain color intensity in the warning image unchanged in order to maintain unchanged warning image brightness regardless of the selected display screen brightness and is also configured to:
   display the non-warning images as images indicating a speed of the vehicle,
   display the warning images as images indicating information required by of legal constraints, and
   display the non-warning image and the warning image simultaneously on the same display screen.

2. The display apparatus according to claim 1, wherein: the first memory portion and the second memory portion are provided within a single memory component.

3. The display apparatus according to claim 1, wherein: the warning image indicates an abnormal vehicle condition.

4. The display apparatus according to claim 1, wherein: the warning image indicates at least one of (a) a coolant temperature and (b) a fuel level of the vehicle.

5. The display apparatus according to claim 1, wherein: the non-warning image represents a navigation image sent from a vehicle navigation system.

6. The display apparatus according to claim 1, wherein: the selected overall display screen brightness is set by a vehicle user.

7. A meter display apparatus configured for mounting on a vehicle, said display apparatus comprising:
   a liquid crystal panel including a display screen having a first portion for displaying a warning image and a second portion for displaying a non-warning image;

a light source configured to backlight the liquid crystal panel at a constant luminance;

a first memory portion configured to store first color intensity data used for displaying the warning image;

a second memory portion configured to store second color intensity data used for displaying the non-warning image; and a control circuit configured to display the warning image based on the first color intensity data and configured to display the non-warning image based on the second color intensity data, wherein the control circuit changes an intensity of color displayed in the non-warning image if both the warning image and the non-warning image are displayed on the display screen in order to change brightness of the non-warning image while maintaining brightness of the warning image that is greater than brightness of the non-warning image; and wherein the control circuit is also configured to:

display the non-warning images as images indicating a speed of the vehicle, display the warning images as images indicating information required by legal constraints, and display the non-warning image and the warning image simultaneously on the same display screen.

8. The display apparatus according to claim 7, wherein:
the first memory portion and the second memory portion are provided within a single memory component.

9. The display apparatus according to claim 7, wherein:
the warning image indicates an abnormal vehicle condition.

10. The display apparatus according to claim 7, wherein:
the warning image indicates at least one of (a) a coolant temperature and (b) a fuel level of the vehicle.

11. The display apparatus according to claim 7, wherein:
the non-warning image represents a navigation image sent from a vehicle navigation system.

12. A meter display apparatus configured for mounting on a vehicle, said display apparatus comprising:

a liquid crystal display (LCD) including a backlight source which provides a substantially constant backlight luminance; and a control circuit configured to controllably change (a) display brightness and (b) color intensity of displayed pixels even though a constant backlight luminance is present;

said control circuit being configured to change displayed pixel color intensity for a non-warning portion of the display as a first function of display brightness;

said control circuit being configured to control displayed pixel color intensity for a different warning portion of the display in accordance with a different second function of display brightness to ensure that the warning display portion maintains a greater brightness than said non-warning portion of the display even when overall display brightness is varied; and wherein said control circuit is also configured to:

display the non-warning images as images indicating a speed of the vehicle, display the warning images as images indicating information required by legal constraints, and display the non-warning image and the warning image simultaneously on the same display screen.

13. A display apparatus for a vehicle as in claim 12, wherein:
said first function increases monotonically with an increased brightness setting; and
said second function remains constant with an increased brightness setting.

14. A display apparatus for a vehicle as in claim 12, further comprising:
a user-controlled display brightness control switch; and
wherein said control circuit is configured to accept a user-selected brightness control input from said control switch.

15. A display apparatus for a vehicle as in claim 12, further comprising:
an automatic ambient light controlled switch; and
wherein said control circuit is configured to accept an automatic sensed ambient light level input from said switch to effect a selected brightness control input.

* * * * *